DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 14, 1973

913 O.G. 393

T913,006

ANTIOXIDANT DISPERSION AND PROCESS

Michael A. Lynch, LaPlace, La., assignor to E. I. du Pont de Nemours and Company, Wilmington, Del.

Continuation of application Ser. No. 145,905, May 21, 1971. This application Feb. 20, 1973, Ser. No. 333,518

Int. Cl. B01j *1/16;* C08d *7/18*

U.S. Cl. 260—17 R

No Drawing. 8 Pages Specification

The high temperature reaction product of diphenylamine and acetone is an effective antioxidant for rubber and rubbery polymers, but is difficult to disperse directly in water to form suspensions stable against settling. This tendency of the antioxidant to separate out is avoided by providing an aqueous dispersion containing (1) at least 25% by weight of the antioxidant as the dispersed phase, and (2) an aqueous phase having a viscosity of about 3–2000 centipoises and consisting of (a) methyl cellulose having a methoxyl content of 27.5–31.5% and a viscosity, as a 2% by weight aqueous solution, of about 10–1000 centipoises, and (b) up to 3% by weight of an alkali metal alkyl sulfate surfactant, the antioxidant being dispersed as droplets of which over 90% have a particle size of less than about 1.5 microns.